(12) United States Patent
Kim-Whitty

(10) Patent No.: US 10,339,569 B2
(45) Date of Patent: Jul. 2, 2019

(54) METHOD AND SYSTEM FOR ADVERTISING AND SCREEN IDENTIFICATION USING A MOBILE DEVICE TRANSPARENT SCREEN, BENDABLE AND MULTIPLE NON-TRANSPARENT SCREEN

(71) Applicant: SK Commercial Construction, Inc., Belton, TX (US)

(72) Inventor: Suk K. Kim-Whitty, Belton, TX (US)

( * ) Notice: Subject to any disclaimer, the term of this patent is extended or adjusted under 35 U.S.C. 154(b) by 0 days.

(21) Appl. No.: 15/640,555

(22) Filed: Jul. 2, 2017

(65) Prior Publication Data

US 2018/0349957 A1 Dec. 6, 2018

Related U.S. Application Data

(63) Continuation-in-part of application No. 15/477,124, filed on Apr. 3, 2017, now Pat. No. 9,967,553, and a continuation-in-part of application No. 15/477,131, filed on Apr. 3, 2017, now Pat. No. 9,801,693, and a continuation-in-part of application No. 15/477,301, filed on Apr. 3, 2017, and a continuation-in-part of application No. 15/464,231, filed on Mar. 20, 2017.

(60) Provisional application No. 62/420,544, filed on Nov. 10, 2016.

(51) Int. Cl.
*G06Q 30/02* (2012.01)
*G06T 11/60* (2006.01)
*G06T 7/20* (2017.01)
*G06T 7/40* (2017.01)
*G06T 7/90* (2017.01)
*G06K 9/00* (2006.01)

(52) U.S. Cl.
CPC ......... *G06Q 30/0267* (2013.01); *G06T 11/60* (2013.01); *G06K 9/00302* (2013.01); *G06K 9/00778* (2013.01); *G06T 7/20* (2013.01); *G06T 2207/30201* (2013.01)

(58) Field of Classification Search
USPC ....................................................... 345/592
See application file for complete search history.

(56) References Cited

U.S. PATENT DOCUMENTS

| | | | | |
|---|---|---|---|---|
| 9,615,054 | B1* | 4/2017 | McNelley | H04N 7/144 |
| 2014/0118258 | A1* | 5/2014 | Park | G06F 1/1694 |
| | | | | 345/158 |
| 2014/0378183 | A1* | 12/2014 | Xiong | H04M 1/72522 |
| | | | | 455/556.1 |
| 2015/0220299 | A1* | 8/2015 | Kim | G06F 3/0488 |
| | | | | 345/1.3 |
| 2017/0163937 | A1* | 6/2017 | McNelley | H04N 7/15 |
| 2018/0217429 | A1* | 8/2018 | Busch | G02F 1/1395 |

* cited by examiner

*Primary Examiner* — Wesner Sajous
(74) *Attorney, Agent, or Firm* — Hulsey P.C.

(57) ABSTRACT

A method and system for advertising and screen identification using an electronic mobile device transparent screen having 3D image processing and analysis capabilities. The display may include one or more display screens varying in translucency on the rear display screen. Advertisements delivered to the electronic mobile devices by virtue of a mobile app are displayed on the electronic device screen outside the confines or borders of the mobile app. Advertisements are viewed on a rear display screen to non-users of the electronic mobile device. Advertisements are displayed based on GPS location of the electronic mobile device.

20 Claims, 5 Drawing Sheets

400a
Front

400b
Rear

400c
Rear

400d
Rear

50ba
Front

500b
Rear

500c
Rear

500d
Rear

US 10,339,569 B2

METHOD AND SYSTEM FOR ADVERTISING AND SCREEN IDENTIFICATION USING A MOBILE DEVICE TRANSPARENT SCREEN, BENDABLE AND MULTIPLE NON-TRANSPARENT SCREEN

CROSS REFERENCE TO RELATED APPLICATIONS

This application further claims the benefit of the following non-provisional applications, all of which are here expressly incorporated by reference:

Ser. No. 15/464,231 entitled "METHOD AND SYSTEM FOR ADVERTISING AND SCREEN IDENTIFICATION USING A MOBILE DEVICE TRANSPARENT SCREEN," filed on Mar. 20, 2017;

Ser. No. 15/477,124, entitled "ENHANCED TRANSPARENT DISPLAY SCREEN FOR MOBILE DEVICE AND METHODS OF OPERATION," filed on Apr. 3, 2017; Ser. No. 15/477,301

Ser. No. 15/477,301, entitled "COLOR ANALYSIS AND CONTROL USING AN ELECTRONIC MOBILE DEVICE TRANSPARENT DISPLAY SCREEN," filed on Apr. 3, 2017; and Ser. No. 15/477,131, entitled "METHOD AND SYSTEM FOR CORRELATING ANATOMY USING AN ELECTRONIC MOBILE DEVICE TRANSPARENT DISPLAY SCREEN," filed on Apr. 3, 2017.

FIELD OF THE INVENTION

The present disclosure relates generally to mobile electronic devices with a transparent display screen. The disclosure further relates to a method and systems method for advertising and screen identification using a mobile device transparent screen.

BACKGROUND

Advertisement and displaying of information on electronic devices has been a rising industry and sales marketing tool in today's business market. These electronic devices, e.g. computers, mobile devices (smartphone and/or tablets), have been increasingly employed in the advertising screen or banner. The vast majority of advertising platforms and models utilizing such electronic devices randomly provide advertisements with web page links, email links, and contemporaneously with mobile applications and games, or via spam in email.

Examples of advertising platforms utilizing mobile devices for advertisement are provided herein below.

U.S. Pat. No. 9,367,093 to Pence discloses a method and system for displaying images on a transparent display of an electronic device. The display includes one or more display screens as well as a flexible circuit for connecting the display screens with internal circuitry of the electric device. Furthermore, the display screens allow for overlaying of images over real world viewable objects, as well as a visible window to be present on an otherwise opaque display screen. Additionally, the display includes active and passive display screens that are utilized based on images to be displayed.

U.S. Patent Application Publication No. 20140188614 to Badenhop discloses a mobile billboard messaging icon displaying messages related to a user's preferences from an advertiser's on the display of a user's devices, such as Smartphone or tablet, having internet connectivity, location technology, and logic means for determining when the user device is in a given vicinity of the advertiser's location. The coordinate location of the device is used to identify advertiser's locations within a preselected distance that correlate with user's preferences. Where a correlation is found, at least one message from the advertiser is displayed on the Smartphone or tablet device. The message is triggered when the device enters within the given radii from the advertiser. When triggered, the messaging icon provides relevant real-time promotions, deals and coupons for purchase of goods and services of the advertisers or sponsors related to the user preferences. The mobile billboard displays target messages based on both the user's specific preferences and the user's geographical real-time location.

U.S. Patent Application Publication No. 20140188616 to Badenhop discloses a mobile billboard messaging app and non-transitory computer readable electronic storage medium. The method includes a computer database electronically storing merchant/advertiser and user information in communication with a software application running in a mobile device of the user. The mobile device has GOS technology, a display screen and Internet connectivity. The method displays on the user's device messages from an advertiser that are logically related to user preferences when the user device is in a given location radii. Where a correlation is found, at least one message from the advertiser is displayed. The message is triggered when the device enters within the given radii from the advertiser. When triggered, the messaging app provides relevant real-time promotions, deals and coupons related to the user preferences. The mobile billboard displays target messages based on both the user's preferences and the user's geographical real-time location.

U.S. Patent Application Publication No. 20150039440 to Doumet discloses a method and system for displaying images on ads delivered to mobile devices by virtue of a mobile app executing on the device are displayed on the device screen outside the confines or borders of the mobile app. This enables app developers to display ads through their apps to app users wherein the ads are displayed outside the confines of the actual app as displayed on the device. That is, the ad may be displayed as what may be characterized as a 'regular non-app generated' ad, such as on the device's home or lock screen (display areas not normally associated with an app). In this manner, clutter is decreased within mobile apps that would otherwise be caused by the ads. Consequently, advertisers are more likely to pay higher rates thereby generating more revenue for app developers or related entities.

None of the heretofore disclosed and/or utilized systems or methods provide utilization of a rear side of transparent display screen to advertise and display an advertisement image, while the electronic mobile device is held up in front of the device user. This in such a manner as to is not in transparent mode or the device is next to the user's ear.

Additionally none of the heretofore disclosed and/or utilized systems or methods provide a mobile electronic device with transparent display screen to display reversed images, text or advertisement from an apps to be read from the rear of the electronic mobile device.

Additionally, none of the heretofore disclosed and/or utilized systems or methods provides a mobile electronic device with multiple transparent display screen layers that can use one of the middle layers of transparent display screen to be black/white out, partial or full (used as divider from front and rear display screen) to display image A in the front and image B in the rear at the same time. Image B in the rear of the screen may display selected image, text or advertisement from apps.

Additionally, none of the heretofore disclosed and/or utilized systems or methods provides an electronic mobile device utilizing sensors on a circuit board to display a transparent screen. The electronic mobile device screen may go blank if the device is showing an image on the rear of the transparent screen. Furthermore, the rear side of the transparent display screen may show a message to the user. The message informing the user to turn the device around if the front or intended display side is not correctly facing the device owner.

Additionally, none of the heretofore disclosed and/or utilized systems or methods provides a multiple layered transparent and/or translucent display screen with rear images that may be shown in different colors, patterns or a combination thereof, to alert the device user of proper orientation. This feature may be beneficial for map/speed apps, which show directional symbols, letters or numbers which may be read in reversed manner.

BRIEF SUMMARY OF THE INVENTION

The present disclosure details method and system that displays digital advertisements on a front surface and a rear surface of a transparent display screen of an electronic mobile electronic device. The electronic device may include a housing, sensors, a display screen.

The display screen may have a front display screen on a front surface and a rear display screen on a rear surface such that the front surface and the rear surface are on opposing sides of the electronic mobile device.

The electronic mobile device may include processors, non-transitory memory units that may be configured to execute a method to display advertisements, images, texts, alerts and a combination thereof.

The present disclosure may allow non-users of an electronic mobile device to view information, advertisements, amber alerts and a combination thereof, on a rear screen of the transparent display screen.

While the present disclosure is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

In light of the present disclosure, here appears a method and system for advertising and screen identification using an electronic mobile device display screen that enables a non-user of the electronic display device to view advertisements and severe alerts and/or information.

The method may be utilized for advertising and screen identification using the electronic mobile device display screen. The method may display one or more active advertisement images on a display screen of the electronic mobile device.

In some embodiments the display screen of the electronic mobile device may be within a visible range from a non-user. In these embodiments the mobile device may comprise a front display screen on a front surface and a rear display screen on a rear surface, such that the front surface and the rear surface are on opposing sides of the electronic mobile device.

In some embodiments, the displaying one or more active advertisement image may include projecting the active advertisement image on the rear surface of the display screen of the electronic mobile device when the electronic mobile device may be at an angle of at least 180 degrees to the side of a user's face.

In some embodiments, the front display screen and the rear display screen may be selectively controlled to simultaneously display different active advertisement images on the front and rear surfaces, respectively.

In some embodiments, the different active advertisement may include one or more predetermined digital advertisements for providing a dual display of advertisements for non-users of the mobile device.

In some embodiments, sensors may be activated to determine the location of the electronic mobile device. The sensors may be embedded within the electronic mobile device which may allow the predetermined digital advertisements to display relative to the location of the determined location of the electronic mobile device.

In some embodiments, sets of computer instructions may be on the electronic mobile display device that may be executed to display on the rear surface of the display screen. In such embodiment, the sets of computer instructions may determine which of a set of predetermined user interface application programs on the mobile device is operating and may communicate information relating to the user interface application programs as an advertisement.

In some embodiments, digital advertisements may be displayed on the rear display screen by inputting computer instructions operating on the electronic mobile device to execute predetermined user interface programs.

In some embodiments the digital advertisements may be an amber alert, weather alert public safety information, or a combination thereof.

In some embodiments, the invention may correlate a plurality of said transparent display screens of the electronic mobile device, such that the plurality of transparent screens translucence range is greater than zero translucence to full transparence.

In some embodiments, may adjust the translucence of the front and rear display screen by selectively controlling the front display screen and the rear display screen simultaneously. The translucence may range from greater than zero translucence to full transparence.

Embodiments of the present disclosure may selectively control the front display screen and the rear display screen simultaneously, which may include adjusting the translucence of the front and rear display screen. In these instant embodiments, the translucence may range from zero to 20% translucence. Furthermore, the active display images may be an essentially full screen graphical image or an user interface text image.

Embodiments of the present disclosure may selectively control the front display screen and the rear display screen simultaneously, which may include displaying active display images as a reflective reverse image of an essentially full screen image on the rear display screen.

Embodiments of the present disclosure may selectively control the front display screen and the rear display screen simultaneously, which may include displaying active display images as non-color shaded images for assisting a user to recognize the orientation of said active display images.

Embodiments of the present disclose may selectively control the front display screen and the rear display screen simultaneously, which may include displaying active display images reverse characters, images or a combination thereof, for indicating a proper display orientation of said active display images.

BRIEF DISCRIPTION OF THE DRAWINGS

The novel features believed characteristic of the disclosed subject matter will be set forth in any claims that are filed later. The disclosed subject matter itself, however, as well as the preferred mode of use, further objectives, and advantages thereof, will best be understood by reference to the following detailed description of an illustrative embodiment when read in conjunction with the accompany drawings, wherein:

Having thus described the invention in general terms, reference will now be made to the accompanying drawings, which are not necessarily drawn to scale, and wherein:

Figure 8:
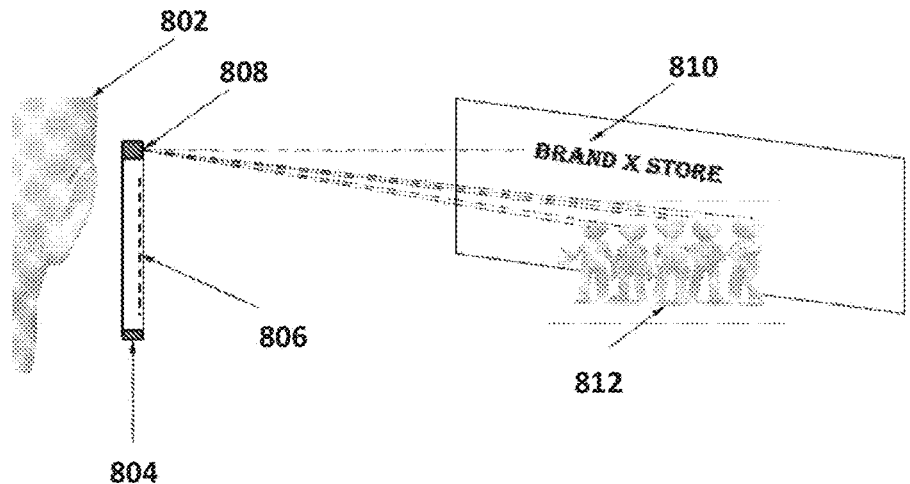

FIG. 8 shows an image of user 802 using mobile device with transparent display screen 804 while advertisement is being displayed 806.

Figure 9:
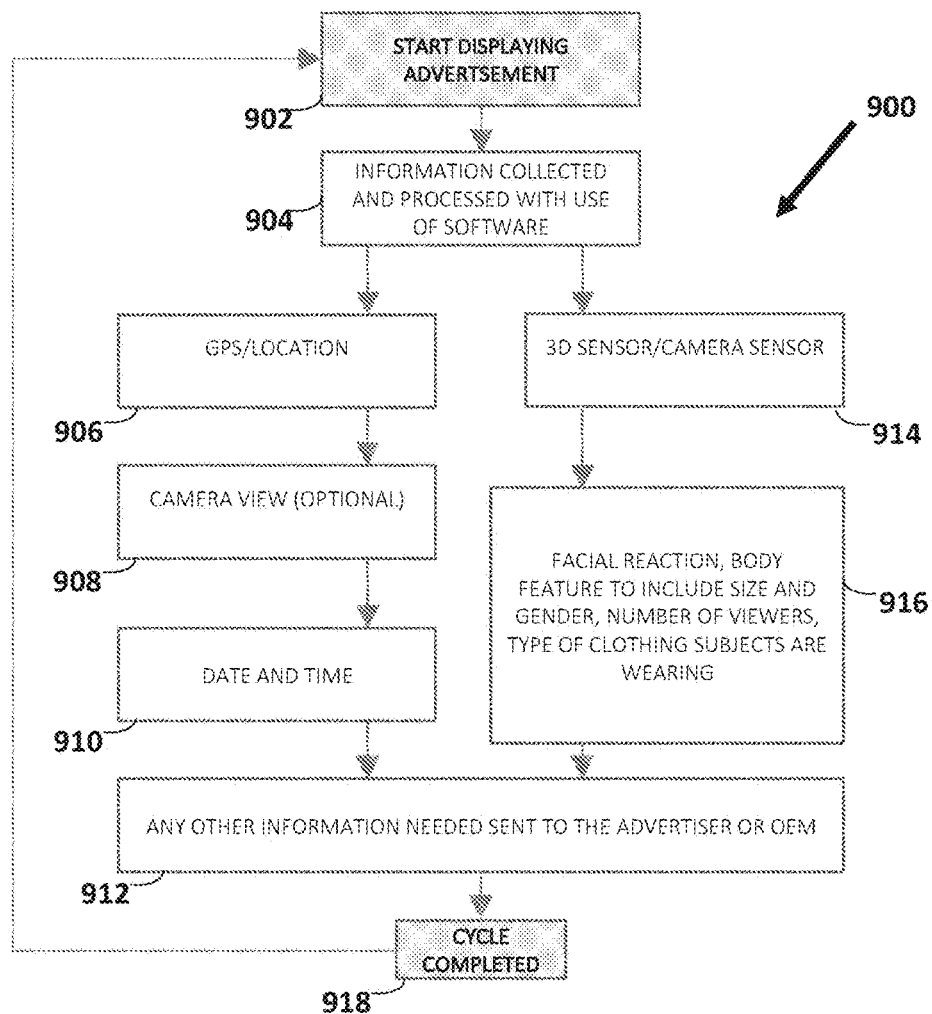

FIG. 9 provides a flow chart 900 as an example process

Figure 10A:
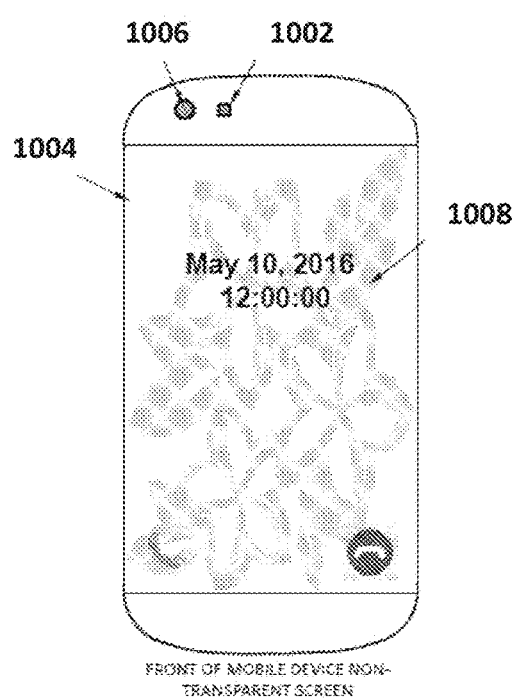
Figure 10B:
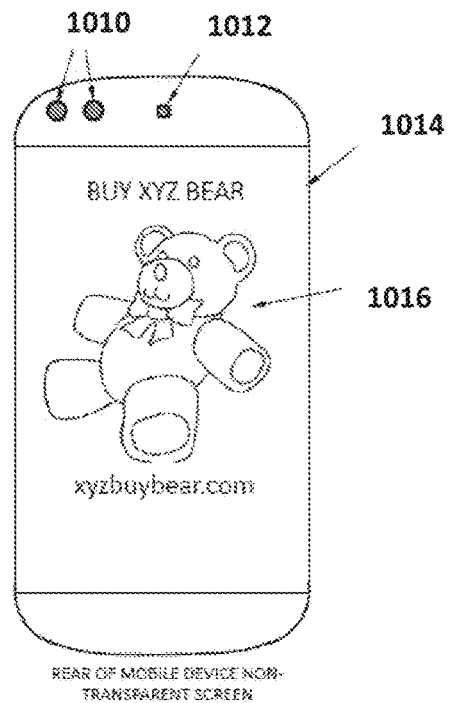
Figure 11A:
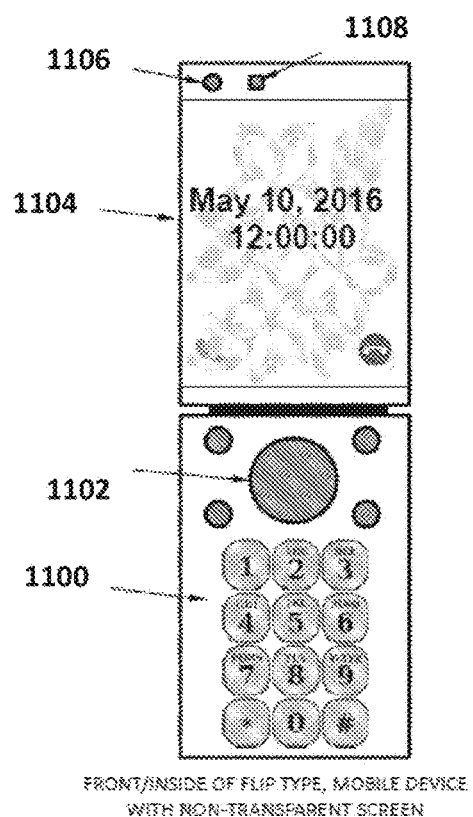
Figure 11B:
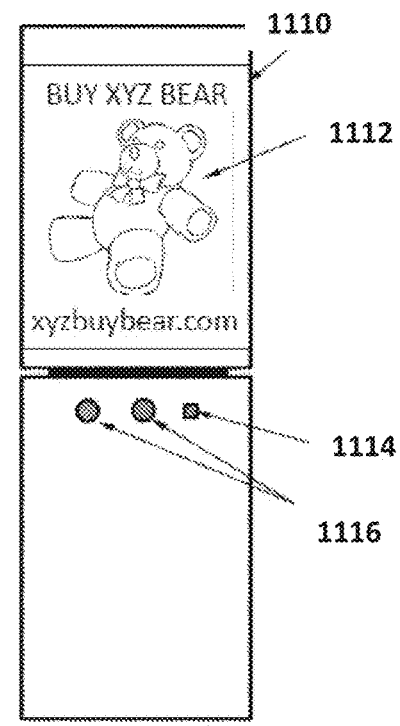

FIGS. 10A and 10B show images of mobile device with two non-transparent display screens FIGS. 11A and 11B show images of flip-type mobile device with two non-transparent screens

DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all the possible embodiments and contexts of the invention in this disclosure. Upon reading this disclosure, many alternative embodiments of the present invention will be apparent to the persons ordinary skill in the art.

Method and system for displaying ads on a mobile device through execution of an app, wherein the ads may be displayed outside the confines of the app as displayed on the transparent display screen are described in the forthcoming figures.

The present disclosure enable app developers to display ads through their apps to app users wherein such ads may be displayed on a front display surface and a rear display surface of an electronic mobile transparent display device. That is, app developers may be able to display ads outside of the present app and onto a rear display surface such that non-users may view the ads. These methods decrease clutter within electronic mobile apps that are caused by ads, and allow more individuals view the ads. Consequently, advertisers may be more likely to pay higher rates thereby generating more revenue for app developers or related entities.

As noted, presently software developers designing electronic mobile apps running on mobile devices can generally only display ads within the confines of the app itself. However, Due to limited screen size of many electronic mobile devices, the constraint increases clutter within the apps making it difficult for users to enjoy the app and forcing ads to be displayed in small and confined areas within the app. This, in turn, decreases the quality and appeal of this form of electronic mobile advertising from the perspective of the advertisers, thereby driving down the economic value of such ads and negatively impacting revenues earned by software developers. Furthermore, revenues earned by software developers are limited because ads are no longer seen by users once an electronic mobile app is closed or shut down.

This disclosure, on the other hand, may empower electronic mobile app developers to display ads to their users as well as non-users wherein the ads are displayed from outside the confines of their mobile apps. This method may decrease clutter due to the ads, while providing an outlet for apps to display ads to their users and non-users and earn revenue from advertisers or ad publishers.

Figure 1A:
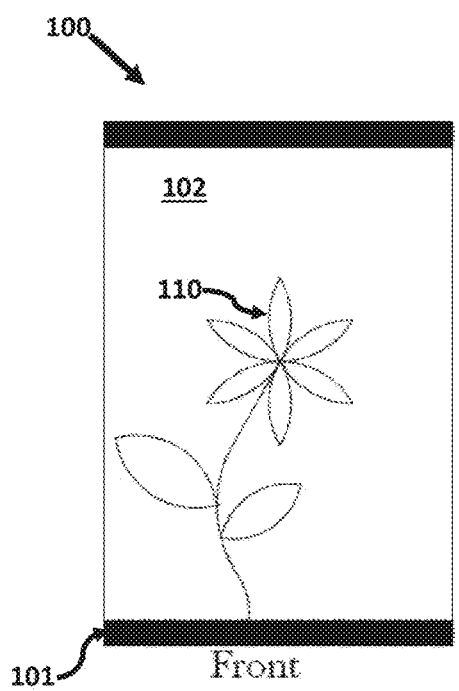
FIGS. 1A and 1B are perspective views illustrating an electronic mobile device with dual transparent screens, in accordance with one embodiment of the present invention.
Figure 1B:
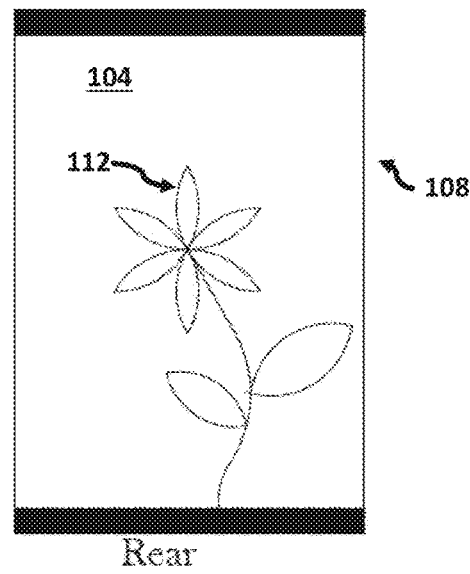

An electronic mobile device 100 is illustrated in FIG. 1 in accordance with one embodiment of the present disclosure. In some embodiments, including the presently illustrated embodiment, the device 100 may be a portable electronic device, such as a tablet computer. Other electronic devices may also include a cellular phone, a personal data organizer, viewable media player, another computer, or the like. Indeed, in such embodiments, a portable electronic mobile device may include a combination of the functionalities of such devices. In addition, the electronic mobile device 100 may allow a user to connect to and communicate through the Internet or through other networks, such as a local or wide area networks. For example, the electronic mobile device 100 may allow a user to access the Internet and to communicate using e-mail, text messaging, or other forms of electronic communication. In other embodiments, the electronic mobile device 100 may include other models and/or types of electronic devices employing a display, available from any manufacturer. Further the electronic mobile device 100 may include handheld devices (e.g., tablet computers and portable media players).

In certain embodiments, the electronic mobile device 100 may be powered by one or more rechargeable and/or replaceable batteries. Such embodiments may be highly portable, allowing a user to carry the electronic mobile device 100 while traveling, working, and so forth. While certain embodiments of the present disclosure are describe with respect to a portable electronic device, it should be noted that the presently disclosed techniques may be applicable to a wide array of other electronic devices and systems that are configured to render graphical data, such as a desktop computer.

In the presently illustrated embodiment, the electronic mobile device 100 includes an enclosure or housing 101. The housing 101 may be formed from plastic, metal, composite materials, or other suitable materials, or any combination thereof. The housing 101 may be, for example, a handheld housing for a handheld device. The housing 101 may protect the interior components of the electronic mobile device, such as processors, circuitry, and controllers, among others, from physical damage, and may shield the interior components from electromagnetic interference (EMI). In one embodiment, the housing 101 may include one or more bezels that may support multiple display screens. The housing 101 may be formed in such a way to provide a support structure for the remaining elements illustrated in FIG. 1. Additionally, some or all of the housing may be made of transparent or translucent material to allow a user to see through the electronic mobile device.

As noted above, the device may include a front surface 106, that includes a front display screen 102. The front display screen 102 may be a liquid crystal display (LCD), which may be a light emitting diode (LED) based display or some other suitable display. For example, the LCD may be an organic light emitting diode display (OLED). Furthermore, as will be further discussed below, the front display screen 102 may include multiple display screens positioned in an overlaid manner such that images displayed on each of the display screens may be concurrently visible on the front display screen 102, as well as a rear display screen 104, on a rear surface 108. In other embodiments, however, the front display screen 102, may include a single display screen. Additionally, the front display screen 102, and the rear display screen 104, may be a touch screen display that allows a user to navigate a displayed user interface, such as a graphical user interface (GUI), and/or other applications running on the electronic mobile device 100. For example, a user may make selections and move a cursor by simply touching the front display screen 102 via a finger or stylus, which may be interpreted by the device 100 to perform an action based on the touch event.

Figure 6A:
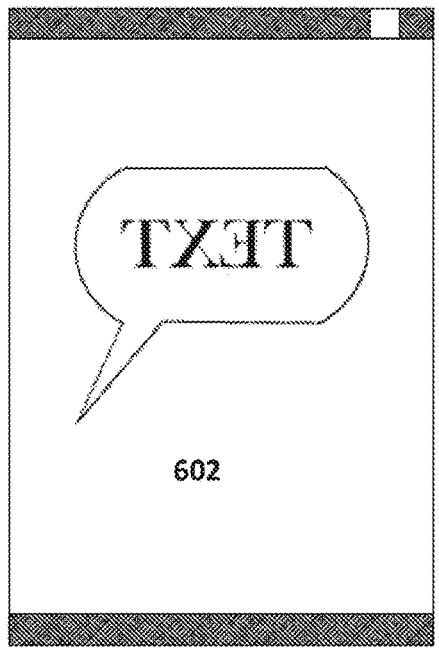
FIGS. 6A and 6B are perspective views of an electronic mobile device with the digital image mirrored on the rear display screen, in accordance with one embodiment of the present invention.
Figure 6B:
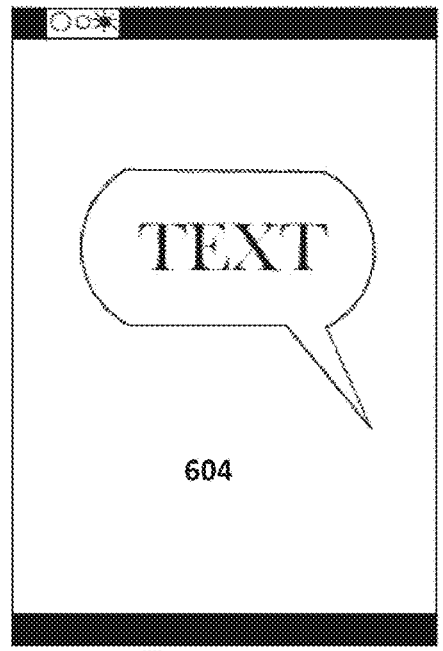
Figure 4A:
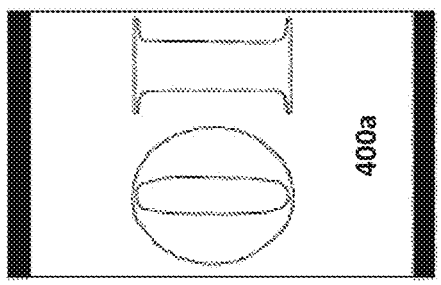
FIGS. 4A through 4D are perspective views of an electronic mobile device varying the pattern of a digital image on the rear display screen, in accordance with one embodiment of the present invention.
Figure 4B:
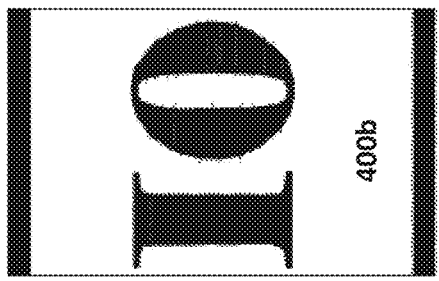
Figure 4C:
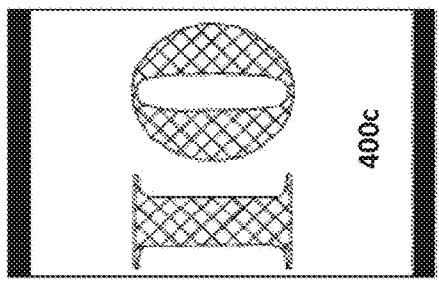
Figure 4D:
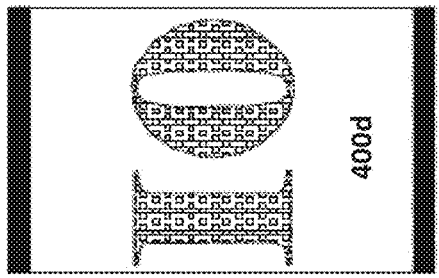
Figure 5A:
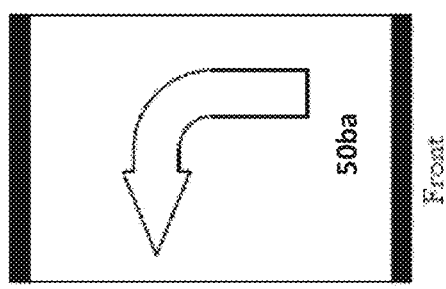
FIGS. 5A through 5d are perspective views of an electronic mobile device varying the pattern of a digital image and mirroring the digital image on the rear display screen, in accordance with one embodiment of the present invention.
Figure 5B:
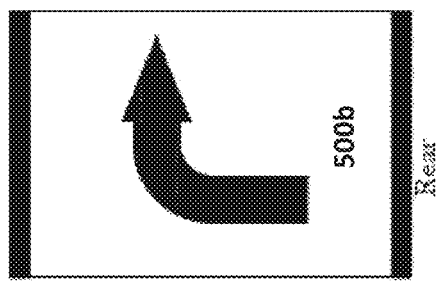
Figure 5C:
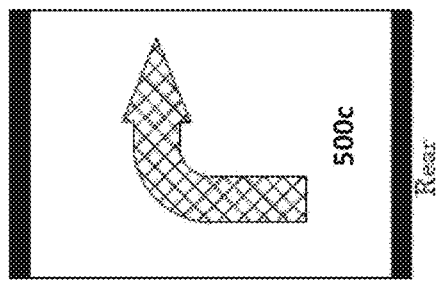
Figure 5D:
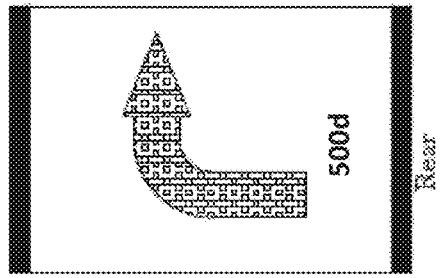

The front display screen 102 and the rear display screen 104 may be used to display one or more images, for example through the use of a liquid crystal substance typically disposed between two substrates, in the case of an LCD, or organic layers that operate to emit light, in the case of an OLED display. Furthermore, it should be noted that the front display screen 102 and the rear display screen 104, may be transparent. That is, light may pass through the front display screen 102 or the rear display screen 104 such that actual images behind the electronic mobile device 100 may be seen through the opposing display screen. In one embodiment, actual objects may be seen through the front display screen 102 and graphical overlays may be seen on the rear display screen 104. In other words, first and second digital images 110 and 112, on the front and rear surfaces, respectively, rendered by the electronic mobile device 100 may be visible on the front display screen 102 and the rear display screen 104, simultaneously. The first and second digital images 110 and 112 may be real-world objects, graphical images, advertisements from apps, emergency information, weather and/or amber alerts, and a combination thereof. As shown in FIG. 1, the second digital image 112 is a mirror image of the first digital image 110. In some embodiments, first and second digital images 110 and 112, on the front and rear surfaces, respectively, rendered by the electronic mobile device 100 may be visible on either the front display screen 102 and the rear display screen 104. FIG. 6 illustrates the reverse of the mirrored digital image. The first and second digital images 110 and 112 may be real-world objects, graphical images, advertisements from apps, emergency information, weather and/or amber alerts, and a combination thereof.

In one embodiment, the entire surface area of the front display screen 102 and the rear display screen 104 may be transparent, allowing a user to view real-world objects through the rear display screen 104. In another embodiment, one or more portions of the front display screen 102 or the rear display screen 104 may be transparent, while the remainder of the display screen may be opaque. In another embodiment, the electronic mobile device 100 may be virtually transparent. That is, the housing 101, the front display screen 102 and the rear display screen 104 are made of a transparent material.

Figure 7:
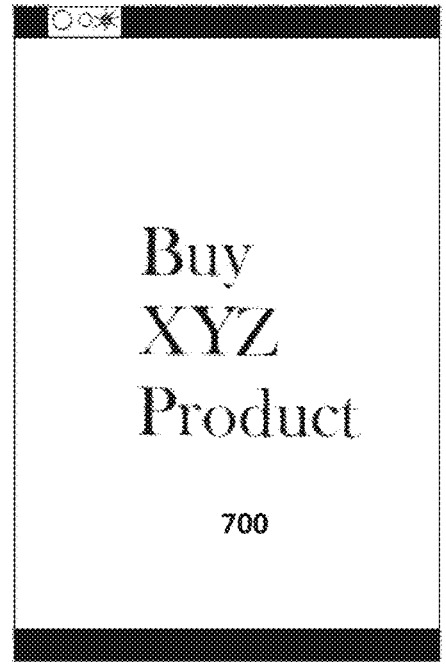
FIG. 7 illustrates an electronic mobile device displaying an advertisement, in accordance with an embodiment of the present invention.

The electronic mobile device, according to some embodiments, may have Internet and GPS connectivity. Advertisements may be displayed on the front display screen 102. In some embodiments, the advertisements from an app may be displayed to non-users by way of the rear display screen 104. An app developer may have an app on the electronic mobile device that displays messages targeted to a user's GPS location The GPS coordinate location of the electronic mobile device may be used to identify advertiser's locations within a preselected distance that correlates with the user's preferences. Where a correlation is found, at least one message from the advertiser may be displayed on the electronic mobile device front display screen 102, rear display screen 104, or a combination thereof. The message may be triggered when the device enters within the given radii from the advertiser. Upon being triggered, the messaging app may provide relevant real-time promotions, deals and coupons for purchase of goods and services of the advertisers or sponsors related to the users preferences. This may allow the advertisers to reach a larger mass of potential buyers. FIG. 7 illustrates an advertisement in accordance to the present embodiment.

Figure 2A:
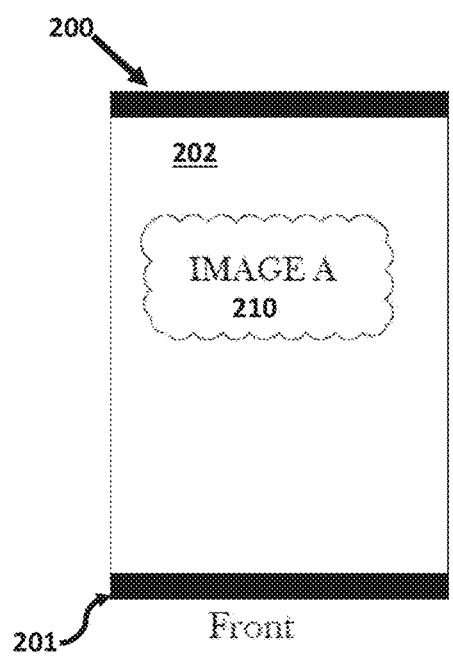
FIGS. 2A and 2B are views illustrating an electronic mobile device with a transparent screen and a rear display screen varying translucency display screen, in accordance with one embodiment of the present invention.
Figure 2B:
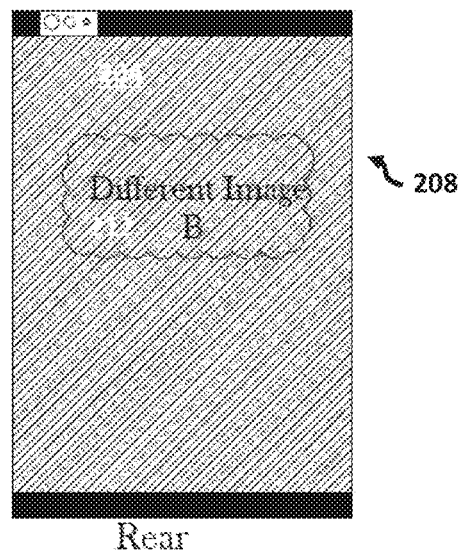

FIG. 2 is an illustration of an embodiment of the present invention including an electronic mobile device 200. It should be noted that FIG. 2 (as well as some subsequent figures) shows an electronic mobile device with similar reference numerals. In these cases, unless otherwise noted, the numerals are the same elements as described in FIG. 1, for sake of explanation. As shown in FIG. 2, electronic mobile device 200 includes a rear surface 208 with a rear display screen 204. In some embodiments, the rear display screen 204 may be partially translucent. A user of the electronic mobile device may want to ensure privacy of the information on the front display screen 202. In this case, the translucency of the rear display screen 204. The translucency may range from 0 to 20 percent, in comparison to the front display screen's transparency range.

As shown in FIG. 2, the first digital image 210 may be different from the second digital image 212. This may allow an user of the electronic mobile device 200 to push the advertisement within the app to the rear display screen 204 to allow non-user's to view the advertisement. The translucency of the rear display screen 204 may be low, 0 percent, for instance, such that the digital image 212 may be viewed clearly by the non-user.

Figure 3:
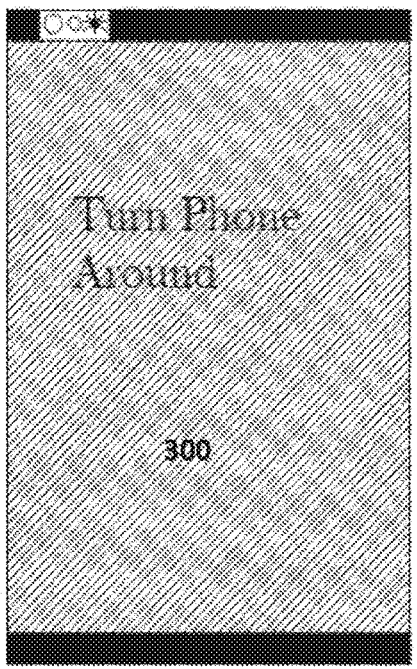
FIG. 3 is a perspective view illustrating the rear display screen of the electronic device of FIG. 2, in accordance with one embodiment of the present invention.

FIG. 3 is an illustration of an embodiment of the present invention where the electronic mobile device 300 may display a message indicating the user to perform a specific function.

FIGS. 4-5 illustrate an embodiment of the present invention that may assist user's or non-user's with color blindness. Some people have a color vision deficiency, which means their perception of colors is different from what most others see. The most severe forms of these deficiencies are referred to as color blindness. People with color blindness are not aware of differences among colors that are obvious to others. In the case of color blindness, most individuals will say that a strawberry is red in color. Various cases occur where individuals with color blindness will see the strawberry as orange. Other examples include yellow appearing greener and colors are not as bright. In other cases, read appears black and certain shades of orange, yellow and green appear green. Furthermore, others may perceive red as black and yellow and green appear redder and difficulty lies with distinguishing violet from purple.

In each of the cases of color blindness, FIGS. 4-5 correct this by adding patterns and texture to the digital images 400a, 400b, 400c, 400d, 500a, 500b, 500c, 500d. This allows advertisers within the electronic mobile app to effectively advertise the goods to non-users suffering from color blindness.

Advantages are rendered through practice of the disclosed method and system for advertising and screen identification using an electronic mobile device. The disclosed invention empowers advertisers, directly and indirectly, to deliver advertisement to potential customers through target advertisement notifications to users and non-users of the electronic mobile device. Furthermore, the present invention may attract and excite a diverse audience of the electronic mobile device users and non-users with a mobile application that will allow them to receive notifications and alerts on discounts, promotions and savings specific to location of the electronic mobile device. The user of the electronic mobile device may display advertisements on a screen such that non-users are able to view the advertisement. Emergency alerts may be displayed to non-users of the device. Furthermore, advertisements may be tailored to individuals suffering from color-blindness.

Additional embodiments of the present disclosure made advantageous use of (a) light coding technology, (b) three-dimensional sensing using speckle patterns, (c) depth-varying light fields for three dimensional sensing, (d) systems and methods for imaging and image processing for creating an image having blurred and non blurred areas, (e) real-time camera tracking using depth maps, and (f) depth map calculation in a stereo camera system, all as may be applicable to the present disclosure and the advantages thereof.

Light Coding Technology-PrimeSense's depth acquisition was enabled by "light coding" technology. Internet address http://www.i3du.gr/pdf/primesense.pdf provides a disclosure of the operation of light coding technology and here is expressly incorporated by reference in its entirety. The process may code a scene as here presented with near-IR light, light that returns distorted depending upon where things are. The solution then used a standard off-the-shelf CMOS image sensor to read the coded light back from the scene using various algorithms to triangulate and extract the 3D data. The product analyzed scenery in 3 dimensions with software, so that devices could interact with users.

U.S. Pat. No. 8,390,821B2 discloses and claims "Three-dimensional sensing using speckle patterns" for mapping of three-dimensional (3D) objects, and specifically to 3D optical imaging using speckle patterns, and is here expressly incorporated by reference in its entirety. This patent disclosure provides apparatus for 3D mapping of an object includes an illumination assembly, including a coherent light source and a diffuser, which are arranged to project a primary speckle pattern on the object. A single image capture assembly is arranged to capture images of the primary speckle pattern on the object from a single, fixed location and angle relative to the illumination assembly. A processor is coupled to process the images of the primary speckle pattern captured at the single, fixed angle so as to derive a 3D map of the object.

U.S. Patent Application Publication No. 20080106746 discloses a "Depth-varying light fields for three dimensional sensing" for mapping three-dimensional (3D) objects, and specifically to 3D optical ranging and mapping, and is here expressly incorporated by reference in its entirety. The patent application publication shows a method for mapping includes projecting onto an object a pattern of multiple spots having respective positions and shapes, such that the positions of the spots in the pattern are uncorrelated, while the shapes share a common characteristic. An image of the spots on the object is captured and processed so as to derive a three-dimensional (3D) map of the object.

U.S. Patent Application Publication No. 20140192238 discloses a "System and Method for Imaging and Image Processing" for creating an image having blurred and non blurred areas using an image capturing device and for creating an image with highlighted differences in an image sequence, and is here expressly incorporated by reference in its entirety. The patent application publication shows for one or more objects of interest from a scene that are selected the calculation of depth information. Additionally, depth information of the scene is calculated. The calculated depth information of the one or more objects is compared with calculated depth information of the scene. Based on the comparison, a blur is applied to an image that includes the scene.

U.S. Pat. No. 9,242,171 discloses a "Real-time camera tracking using depth maps" for tracking the orientation and position of a camera as it moves in an environment, and is here expressly incorporated by reference in its entirety. The patent shows a real-time camera tracking using depth maps. In an embodiment depth map frames are captured by a mobile depth camera at over 20 frames per second and used to dynamically update in real-time a set of registration parameters which specify how the mobile depth camera has moved. In examples the real-time camera tracking output is used for computer game applications and robotics. In an example, an iterative closest point process is used with projective data association and a point-to-plane error metric in order to compute the updated registration parameters. In an example, a graphics processing unit (GPU) implementation is used to optimize the error metric in real-time. In some embodiments, a dense 3D model of the mobile camera environment is used.

U.S. Patent Application Publication No. 20170069097 discloses a "Depth Map Calculation in a Stereo Camera System" for generating a depth map using a stereo camera system to capture two images of an object, determining a difference in blur between the two images at a particular point, and determining a depth for a depth map based on the difference in blur. US patent application publication No. 20170069097 is here expressly incorporated by reference in its entirety. The method includes obtaining a first image of scene from a first image capture unit, the first image having a first depth-of-field (DOF), obtaining a second image of the scene from a second image capture unit, the second image having a second DOF that is different than the first DOF. Each pixel in the second image has a corresponding pixel in the first image. The method also includes generating a plurality of third images, each corresponding to a blurred version of the second image at the each of a plurality of specified depths, generating a plurality of fourth images, each representing a difference between the first image and one or the plurality of third images, and generating a depth map where each pixel in the depth map is based on the pixels in one of plurality of fourth images.

In light of the above, the present improvement provides for the display on a mobile device with transparent display screen through collection of various information for feedback with utilization of all sensors to include 3D camera and or 3D sensor.

The present disclosure, using all of the subject herein presented and incorporated by reference, provides for the collection of information from a mobile device with transparent display screen, and mobile device with dual non-transparent screen facing front and rear (rear screen may be E-type reader) with utilization software, GPS/Location, date and time data and all sensors to include camera base 3D and or 3D sensor. Such functions and benefits include, and are not limited to (a) measuring the mobile device's distance from the advertisement viewers; (b) facial reaction as advertisement is being displayed; (c) eye position toward the advertisement while being displayed; (d) Body/clothing features to include size and mass of audience; (e) audience gender; (f) number of audience within sensor's area limits; (g) type of clothing audience are wearing; (h) surrounding environment information; (i) identify color; as well as (j) any other information sensors to include 3D sensor data may be able to collect with mobile device.

In conjunction with the data collection and functions as provided above, the disclosed subject matter discloses and expressly incorporates features and functions including a mobile software application to adjust, improve AR/MR images. These functions may include (a) refining an advertisement for a target audience; (b) enhancing advertisement for target audience; (c) adjusting the size of the advertisement or image; (d) enhancing the content of advertisement; (e) aligning the subject and generated image through transparent display screen; (f) changing the size of the generated advertisement, AR, MR image; (g) changing the duration of advertisement or image content ; (h) adjusting the depth and angle of AR, MR image; (i) correcting the angle of view for parallax image; (j) aligning users viewing angle to display image AR, MR image color intensity to include translucent images; as well as (k) any other modifications to advertisement, as needed to increase improve visual and subject content.

A further improvement from the earlier described subject matter relates to advertisements delivered to the electronic mobile device using the mobile app. These advertisements are displayed on the electronic device screen outside the confines or borders of the mobile app. Advertisements are viewed on a rear display screen to non-users of the electronic mobile device. The improvements also may apply to type of mobile device with dual non-transparent display screen in front and rear (rear screen may be E-type reader screen), or flip-type mobile device with front (inside screen) and rear (outside screen). Advertisements may be displayed on non-viewing side of display screen, or while mobile device is next to device user's ear. While displaying such advertisement, a mobile device with transparent display screen will use software, GPS/location, time and date, on, information/data collected from 3D sensor, 3D camera sensor. The mobile device may further include facial reaction, eyes position alignment toward the advertisement, body features to include size and mass, gender, number of people with in sensor's area limits, type of clothing subjects are wearing, surrounding environment information, and any other information 3D sensor may be able to collect within mobile device's advertisement viewable area and or senor's area limit. With collected information, advertisers may adjust image display size, color, duration translucency, angle of view of parallax images, depth and angle of advertisement image, subject content according to demographic of the viewers and any other information deemed important to advertiser for immediate or future advertisements, this information collection process may be optional and with device user's acknowledgement/consent.

To improve augmented reality (AR) and translucent images displayed on transparent display screen, images may be adjusted with information collected for weather, surrounding lighting, time, date, location, and any other means that the mobile device camera and sensors can detect. For example, an image of translucent object on bright daylight may be compared with the same object in low light environment. Places where light intensity is low even during day time, such as Fairbanks, Alaska, the translucency of the screen need to be adjusted to adapt to the surrounding environment.

FIG. 8 shows an image of user 802 using mobile device with transparent display screen 804 while advertisement is being displayed 806. As advertisement is viewed by others within the viewable area of mobile device 812, 3D sensors 808 may collect information of surrounding area 812 and 810, such as target audience and surroundings.

FIG. 9 provides a flow chart 900 as an example of process starting at step 902 including using software, GPS/location 906, time and data 910, on mobile device with transparent display, information from 3D sensor 914, camera sensor 908 may include facial reaction 916, eyes position toward the advertisement while being displayed, body features to include size and mass, gender, number of people with in sensor's area limits, type of clothing subjects are wearing, surrounding information, and any other information 912 3D sensor may be able to collect within mobile device's advertisement viewable area and or senor's area limit. With collected information 904, advertisers may adjust size, color, duration, subject content according to demographic of the viewers and any other information deemed important to advertiser for future advertisements while mobile device is in use with known knowledge by device user. This process can be modified or restructured as needed according to different operating systems and capabilities of different mobile devices.

FIGS. 10A and 10B show images of mobile device with two non-transparent display screens: one in the front and one in the rear. The rear screen may be E-type reader screen. Front screen 1004 displaying functions with time and date 1006, front camera 1008 next to front 3D sensor 1100. Rear dual camera 1102 next to rear sensor 1104, advertisement 1108 being displayed on rear display screen 1106 while device user is viewing front screen or mobile device is next to device user's ear.

FIGS. 11A and 11B show images of flip-type mobile device with two non-transparent screens: one in the front and one in the rear. Keyboard 1100, multi-function button 1102, front/inside flip-up screen 1104, front camera 1106, optional front 3D sensor 1108. Rear/outside display screen 1110, advertisement 1112 being displayed while mobile device is used next to device user's ear or device user is viewing from front/inside screen. Rear dual camera 1116 and rear 3D sensor 1114.

The benefits and advantages that may be provided by the present invention has been described above with regard to specific embodiments. These benefits and advantages, and any elements or limitations that may cause them to occur or to become more pronounced are not to be construed as critical, required, or essential features of any of any or all of the claims. As used herein, the singular forms "a", "an", and "the" are intended to include the plural forms as well, unless the context clearly indicates otherwise. It is further understood that the terms "comprises" and/or "comprising" or "includes" and/or including", or any other variation thereof, are intended to be interpreted as nonexclusively including the elements or limitations which follow those terms. Accordingly, a system, method, or other embodiment that comprises a set of elements is not limited to only those elements, and may include other elements not expressly listed or inherent to the claimed embodiment. These terms when used in this specification, specify the presence of stated features, regions, integers, steps, operations, elements, and/or components, but do not preclude the presence or addition of one or more features, regions, integers, steps, operations, elements, components, and/or groups thereof.

What is claimed is:

1. A method for advertising and screen identification using a mobile device display screen comprising:
   displaying one or more active advertisement image on a transparent display screen of an electronic mobile device;
   collecting advertisement enhancing information;
   enhancing said one or more active advertisements image displayed on said transparent display screen using said advertisement enhancing information, said advertisement enhancing information comprising a location of the device, date and time data, a distance of the mobile device from a viewer and/or potential viewer of the advertisement, a facial reaction of said viewer and/or potential viewer as an advertisement is being displayed, an eye position of said viewer and/or potential viewer with respect to a displayed advertisement, body features of said viewer and/or potential viewer, clothing features of said viewer and/or potential viewer, gender of said viewer and/or potential viewer, a number of viewers and/or potential viewers within a predetermined area, surrounding environment information, and combinations thereof,
   wherein said advertisement enhancing information is collected by the mobile device with utilization of a 3D camera and/or 3D sensor;
   wherein the display screen of the electronic mobile device is within a visible range from said viewer and/or potential viewer when said one or more active advertisement images is displayed;
   wherein the electronic mobile device comprises a front display screen on a front surface and a rear display screen on a rear surface;
   further wherein the front surface and the rear surface are on opposing sides of the electronic mobile device;
   wherein displaying one or more active advertisement image includes projecting the said active advertisement image on the rear surface of the display screen of the said electronic mobile device;
   wherein displaying one or more active advertisement image further comprises selectively controlling said front display screen and said rear display screen simultaneously to display different active advertisement images on said front and rear surfaces, respectively;
   wherein the different active advertisement includes one or more predetermined digital advertisements for providing a dual display of advertisements for said viewer and/or potential viewer of the electronic mobile device,
   wherein displaying one or more active advertisement image, collecting advertisement enhancing information, and enhancing said one or more active advertisements image are performed through software resident on the mobile device.

2. The method of claim 1, further comprising measuring the mobile device's distance from the advertisement viewers to obtain said advertisement enhancing information comprising a distance of the mobile device from a viewer and/or potential viewer of the advertisement.

3. The method of claim 1, further comprising determining a facial reaction of an audience member as an advertisement is being displayed to obtain said advertisement enhancing information comprising a facial reaction of said viewer and/or potential viewer as an advertisement is being displayed.

4. The method of claim 1, further comprising tracking an audience member's eye position toward the advertisement while being displayed to obtain said advertisement enhancing information comprising an eye position of said viewer and/or potential viewer with respect to a displayed advertisement.

5. The method of claim 1, further comprising capturing and analyzing body and/or clothing features of an audience to include size and mass of audience to obtain said advertisement enhancing information comprising body features of said viewer and/or potential viewer, clothing features of said viewer and/or potential viewer, or a combination thereof.

6. The method of claim 1, further comprising determining the gender of a plurality of audience members to obtain said advertisement enhancing information comprising gender of said viewer and/or potential viewer.

7. The method of claim 1, further comprising determining the numerical size of audience within sensor's area limits to obtain said advertisement enhancing information comprising a number of viewers and/or potential viewers within a predetermined area.

8. The method of claim 1, further comprising determining the type of clothing a plurality of audience members are wearing to obtain said advertisement enhancing information comprising clothing features of said viewer and/or potential viewer.

9. The method of claim 1, further comprising adjusting the content of an advertisement according to at least one measured parameter of a plurality of audience members.

10. The method of claim 1, further comprising adjusting the size of the advertisement or image on said display screen according to the size of the audience and distance from the audience.

11. A system for advertising and screen identification using an electronic mobile device display screen comprising: an electronic mobile device; wherein the electronic mobile device comprises: a housing; one or more sensor; a display screen comprising a front display screen on a front surface and a rear display screen on a rear surface, wherein the front surface and the rear surface are on opposing sides of the electronic mobile device; a 3D camera and or 3D sensor for enhancing one or more active advertisements images displayed on said transparent display screen through collecting advertisement enhancing information by the mobile device; a processor; a non-transitory memory units coupled to said processor that when executed by the processor are configured to perform a method, comprising:

displaying said one or more active advertisement images on said display screen of said mobile device;

wherein the display screen of the mobile device is within a visible range from a viewer and/or potential viewer when said one or more active advertisement images is displayed; wherein displaying one or more active advertisement image includes projecting the said active advertisement image on the rear surface of the said display screen of the said electronic mobile device; selectively controlling said front display screen and said rear display screen simultaneously to display different active advertisement images on said front and rear surfaces, respectively; wherein the different active advertisement includes one or more predetermined digital advertisements for providing a dual display of advertisements for said viewer and/or potential viewer of the mobile device, wherein said advertisement enhancing information comprising a location of the device, date and time data, a distance of the mobile device from a viewer and/or potential viewer of the advertisement, a facial reaction of said viewer and/or potential viewer as an advertisement is being displayed, an eye position of said viewer and/or potential viewer with respect to a displayed advertisement, body features of said viewer and/or potential viewer, clothing features of said viewer and/or potential viewer, gender of said viewer and/or potential viewer, a number of viewers and/or potential viewers within a predetermined area, surrounding environment information, and combinations thereof, wherein enhancing one or more active advertisements images displayed, and collecting advertisement enhancing information, are performed through software resident on the mobile device.

12. The system of claim 11, further comprising instructions associated with said processor and circuitry associated with said 3D camera and/or 3D sensor for measuring the mobile device's distance from the advertisement viewers.

13. The system of claim 11, further comprising instructions associated with said processor and circuitry associated with said 3D camera and/or 3D sensor for determining a facial reaction of an audience member as an advertisement is being displayed.

14. The system of claim 11, further comprising instructions associated with said processor and circuitry associated with said 3D camera and/or 3D sensor for tracking an audience member's eye position toward the advertisement while being displayed.

15. The system of claim 11, further comprising instructions associated with said processor and circuitry associated with said 3D camera and/or 3D sensor for capturing and analyzing body/clothing features of an audience to include size and mass of audience.

16. The system of claim 11, further comprising instructions associated with said processor and circuitry associated with said 3D camera and/or 3D sensor for audience members.

17. The system of claim 11, further comprising instructions associated with said processor and circuitry associated with said 3D camera and/or 3D sensor for determining the numerical size of audience within sensor's area limits.

18. The system of claim 11, further comprising instructions associated with said processor and circuitry associated with said 3D camera and/or 3D sensor for determining the type of clothing a plurality of audience members are wearing.

19. The system of claim 11, further comprising instructions associated with said processor and circuitry associated with said 3D camera and/or 3D sensor for adjusting the content of an advertisement according to at least one measured parameter of a plurality of audience members.

20. The system of claim 11, further comprising instructions associated with said processor and circuitry associated with said 3D camera and/or 3D sensor for adjusting the size of the advertisement or image on said display screen according to the size of the audience and distance from the audience.

* * * * *